(12) United States Patent
Andersson et al.

(10) Patent No.: US 7,437,988 B2
(45) Date of Patent: Oct. 21, 2008

(54) PISTON-CYLINDER DEVICE WITH POSITION SENSING MEANS

(75) Inventors: Bo Ake Andersson, Borås (SE); Pär Gunnar Johan Johansson, Älmhult (SE)

(73) Assignee: Parker Hannifin AB, Boras (SE)

( * ) Notice: Subject to any disclaimer, the term of this patent is extended or adjusted under 35 U.S.C. 154(b) by 102 days.

(21) Appl. No.: 10/552,413

(22) PCT Filed: Apr. 7, 2004

(86) PCT No.: PCT/SE2004/000560
§ 371 (c)(1),
(2), (4) Date: May 31, 2006

(87) PCT Pub. No.: WO2004/090344
PCT Pub. Date: Oct. 21, 2004

(65) Prior Publication Data
US 2007/0007949 A1 Jan. 11, 2007

(30) Foreign Application Priority Data
Apr. 7, 2003 (SE) .................................... 0301015

(51) Int. Cl.
F01B 31/12 (2006.01)
(52) U.S. Cl. ........................ 92/5 R; 92/169.1
(58) Field of Classification Search ............... 92/5 R, 92/169.1; 91/1
See application file for complete search history.

(56) References Cited

U.S. PATENT DOCUMENTS

| 4,914,916 | A | * | 4/1990 | Leigh-Monstevens et al. | 92/5 R |
| 5,103,172 | A | * | 4/1992 | Stoll | 92/5 R |
| 5,198,761 | A | | 3/1993 | Hashimoto et al. | |
| 5,514,961 | A | | 5/1996 | Stoll et al. | |
| 6,427,576 | B1 | * | 8/2002 | Bock et al. | 92/5 R |
| 6,691,605 | B2 | * | 2/2004 | Rollg.ang.rdh | 92/5 R |
| 6,705,198 | B2 | * | 3/2004 | Hirling | 91/1 |

FOREIGN PATENT DOCUMENTS

GB 2389659 A 12/2003

* cited by examiner

Primary Examiner—Michael Leslie
(74) Attorney, Agent, or Firm—Frishauf, Holtz, Goodman & Chick, P.C.

(57) ABSTRACT

A pressure activated piston-cylinder device includes a cylinder barrel with a cylinder bore, a piston with a piston rod movably guided in the cylinder bore, and a piston position sensing and indicating device. The piston position sensing and indicating device includes a magnetic activating element carried on the piston and an elongate electronic contact free transducer mounted on the cylinder barrel. The cylinder barrel includes a standard type extruded aluminum alloy barrel with an outer channel which extends in an offset parallel disposition relative to the cylinder bore, and a circuit board with electronic components connected to the transducer. The transducer as well as the circuit board are located in the groove in the cylinder barrel.

20 Claims, 1 Drawing Sheet

PISTON-CYLINDER DEVICE WITH POSITION SENSING MEANS

FIELD OF THE INVENTION

The invention relates to a pressure medium activated piston-cylinder device with a piston position indicating device which comprises a magnetic activating element on the piston and a sensor means supported on the cylinder barrel.

DESCRIPTION OF RELATED ART

According to a common technique, indication of piston positions in a cylinder bore is accomplished by a device comprising a magnetic activating element mounted on the piston and one or more single-point sensors adjustably mounted on the cylinder barrel. A problem concerned with this known technique is the difficulty to obtain a quick and easy setting of the sensors in the cylinder barrel. These sensors have to be moved individually and locked in their intended positions by manual operations, which is rather tricky and time consuming. Another problem is that the number of indicated positions is limited to a few points, which is limiting to the piston operation control possibilities.

A further problem concerned with this known technique is to accomplish a compact piston-cylinder device where the position sensing means, including signal treating electronic components, do not add to the outer dimensions of the device but are confined within the outer dimensions of a standard type piston-cylinder device and safely protected from inter alia mechanical damage.

In U.S. Pat. No. 6,351,117 there is described an alternative way of obtaining position indication in a piston-cylinder device by means of a magnetically activated magnetostrictive transducer using electric pulses for measurement. The transducer is mounted concentrically in the cylinder bore and extends from one of the cylinder end walls into the piston/piston rod, whereas the activation magnet is mounted on the piston. This is, however, a rather awkward location of the transducer, because it not only requires an expensive specially designed piston/piston rod and cylinder end wall but the transducer is difficult to get to in case of maintenance and replacement. A problem arising at piston-cylinder device applications is to find a way to locate the transducer without complicating the cylinder design compared to the above related common technique.

One solution to the transducer location problem is described in U.S. Pat. No. 5,514,961 where the transducer is located in a bore in the cylinder barrel parallel to the cylinder bore. An evaluation device including electronic components is mounted in an extension of the cylinder barrel. This means not only that a specially designed cylinder barrel with a drilled extra bore for the sensor has to be used, but also that the arrangement of the electronic evaluating device adds to the length of the cylinder.

SUMMARY OF THE INVENTION

The above-identified problems related to prior art piston-cylinder devices with position sensing transducers are solved by the invention in that a piston-cylinder device is created wherein a standard type of extruded aluminium alloy barrel is used and wherein both the position sensing transducer and the circuit board electronics are fitted without any advanced extra machining of the cylinder barrel and without adding to the outer dimensions of the device. Instead, the device according to the invention may preferably incorporate a standard type cylinder barrel having dimensions meeting the international standard specifications of ISO and VDM A.

BRIEF DESCRIPTION OF THE DRAWINGS

A preferred embodiment of the invention is described below with reference to the accompanying drawings.

In the drawings.

DETAILED DESCRIPTION

Figure 1:
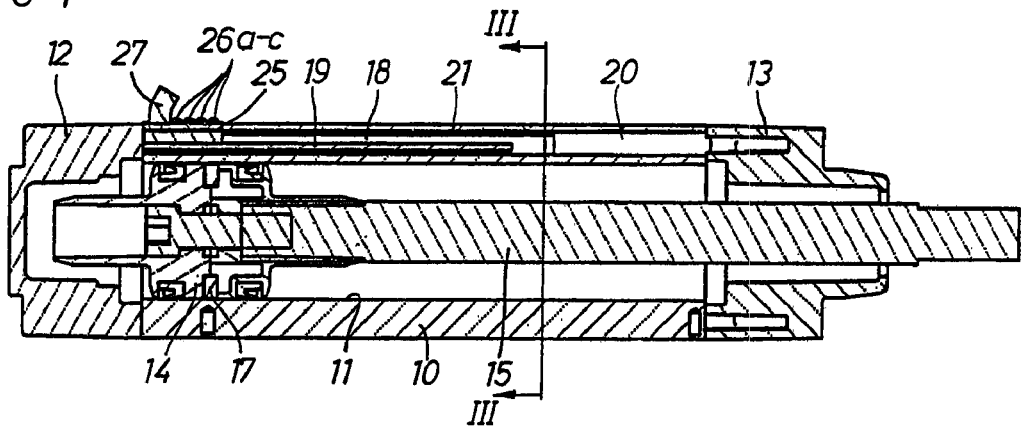
FIG. 1 shows a longitudinal section through a piston-cylinder device according to the invention.
Figure 2:
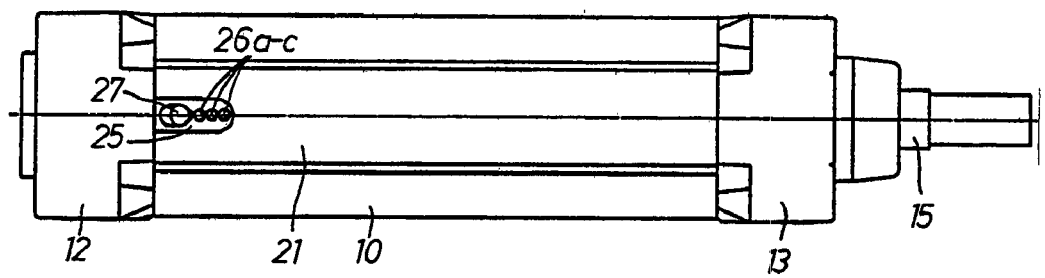
FIG. 2 shows a top view of the device in FIG. 1.
Figure 3:
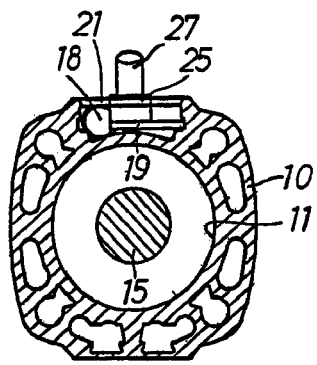
FIG. 3 shows a cross section along line III-III in FIG. 1.

The piston-cylinder device illustrated in the drawings comprises a cylinder barrel 10 with a cylinder bore 11 and two opposite end walls 12 and 13, a piston 14 movably guided in the cylinder bore 11 and a piston rod 15 extending out of the cylinder barrel 10 via an opening in one of the end walls 12. The cylinder barrel 10 is of a standard type including an extruded aluminium alloy body with an outer elongate cavity or channel 20, which is formed at the extrusion process. This means that no advanced extra machining of the barrel 10 is necessary. The cylinder barrel 10 as well as the complete piston-cylinder device is dimensioned to meet the international standard specifications of ISO and VDM A.

In a common way, the cylinder barrel 10 is provided with non-illustrated connections for communication of a pressure medium to and from the cylinder bore 11 as well as passages for ducting motive pressure medium to and from the ends of the cylinder bore 11 for accomplishing movement of the piston.

A position sensing and indicating device comprises an activating magnetic element 17 mounted on the piston 14, and an elongate electric contact free sensor unit in the form of a magnetostrictive transducer 18 mounted in the channel 20 in the cylinder barrel 10. The transducer 18 extends over a major part of the length of the cylinder barrel 10 and is connected to electronic components on a circuit board 19. The circuit board 19 is also mounted in the channel 20.

Since the channel 20 is open to the outside of the cylinder barrel 10 the transducer 18 and the circuit board 19 have to be protected from external damage, dirt etc. Such protection is accomplished by a cover strip 21 which is preferably made of a resinous material and is arranged to close the channel 20 to the ambient environment.

So, the channel 20 is wide enough to comprise the circuit board 19, and adjacent to the circuit board 19 a panel 25 is located that holds a number of LED elements 26*a-c* for visual indication of pre-set positions reached by the piston 14. A cable 27 extends out through the panel 25 for connecting the circuit board 19 to a remotely located programmable control unit, for instance a PC.

In operation, indications are obtained as the magnetic element 17 on the piston 14 passes certain chosen indication points on the transducer 18. These indications are shown visually via the LED elements and are used for governing the supply of pressure medium to and from the cylinder bore 11, thereby controlling the operation of the piston 14. Since this type of position indicating transducer 18 makes it possible to get indications of a large number of piston positions, it is possible not only to obtain stop/start functions but also retardation ramps, for instance in the vicinity of the cylinder end walls 12,13. This makes it possible to simplify the cylinder design by omitting the adjustable flow restrictions normally built-in in the cylinder end walls 12 and 13.

The operation order of the micro pulse operated magnetostrictive transducer 18 is well known per se, for instance through U.S. Pat. No. 3,898,555, and is not described in detail in this specification.

The invention is new and makes it possible to obtain the combination of an over all compact cylinder design with well protected sensor components. Also, the invention makes it possible to accomplish a non-expensive piston-cylinder device with an advanced position sensing means by utilising a relatively cheap standard type of extruded aluminium alloy cylinder barrel.

The position indicating points on the transducer 18 are set electronically via a remotely located computer and the electronic components of the circuit board 19. The electronics are preferably arranged so as to enable an indication point setting according to the teach-in technique.

By locating the position transducer 18 and the electronic circuit board 19 in the channel 20 originally formed in the cylinder barrel 10, a non-expensive and compact piston-cylinder device is obtained with over all dimensions meeting the ISO and VDMA standard specifications. Also, the new device provides for a good accessibility of the transducer and the circuit board for service and replacements.

The invention claimed is:

1. A pressure medium activated piston-cylinder device comprising:
   a cylinder barrel with a cylinder bore;
   a piston movably guided in the cylinder bore; and
   a piston position indicating device including a magnetic activating element mounted on the piston and an elongate electronic contact free transducer mounted on and extending over a major part of a length of the cylinder barrel;
   wherein the cylinder barrel has an outer elongate channel extending in parallel with the cylinder bore,
   wherein a circuit board which supports electronic components is connected to said transducer,
   wherein the transducer and the circuit board are located in the channel, and
   wherein the magnetic activating element and the elongate electronic contact free transducer are arranged such that indications are obtained when the magnetic activating element on the piston passes chosen indication points on the elongate electronic contact free transducer.

2. The device according to claim 1, wherein the cylinder barrel comprises an extruded aluminum alloy body, and the channel is formed during the extrusion process.

3. The device according to claim 1, further comprising a protective cover strip to close the channel with respect to an ambient environment.

4. The device according to claim 2, further comprising a protective cover strip to close the channel with respect to an ambient environment.

5. The device according to claim 1, further comprising at least one LED element mounted on the cylinder barrel and connected to the circuit board for providing a visual indication when a corresponding pre-selected piston position is reached.

6. The device according to claim 2, further comprising at least one LED element mounted on the cylinder barrel and connected to the circuit board for providing a visual indication when a corresponding pre-selected piston position is reached.

7. The device according to claim 3, further comprising at least one LED element mounted on the cylinder barrel and connected to the circuit board for providing a visual indication when a corresponding pre-selected piston position is reached.

8. The device according to claim 4, further comprising at least one LED element mounted on the cylinder barrel and connected to the circuit board for providing a visual indication when a corresponding pre-selected piston position is reached.

9. The device according to claim 1, wherein the electronic components on the circuit board are arranged for remote pre-selecting of desired piston positions via teach-in.

10. The device according to claim 2, wherein the electronic components on the circuit board are arranged for remote pre-selecting of desired piston positions via teach-in.

11. The device according to claim 3, wherein the electronic components on the circuit board are arranged for remote pre-selecting of desired piston positions via teach-in.

12. The device according to claim 4, wherein the electronic components on the circuit board are arranged for remote pre-selecting of desired piston positions via teach-in.

13. The device according to claim 5, wherein the electronic components on the circuit board are arranged for remote pre-selecting of desired piston positions via teach-in.

14. The device according to claim 6, wherein the electronic components on the circuit board are arranged for remote pre-selecting of desired piston positions via teach-in.

15. The device according to claim 7, wherein the electronic components on the circuit board are arranged for remote pre-selecting of desired piston positions via teach-in.

16. The device according to claim 8, wherein the electronic components on the circuit board are arranged for remote pre-selecting of desired piston positions via teach-in.

17. A pressure medium activated piston-cylinder device comprising:
   a cylinder barrel with a cylinder bore;
   a piston movably guided in the cylinder bore; and
   a piston position indicating device including a magnetic activating element mounted on the piston and a sensor unit mounted on and extending over a major part of a length of the cylinder barrel;
   wherein the cylinder barrel has an elongate extruded cavity extending in parallel with the cylinder bore,
   wherein a circuit board which supports electronic components is connected to said sensor unit,
   wherein the sensor unit and the circuit board are located in the cavity, and
   wherein the magnetic activating element and the sensor unit are arranged such that indications are obtained when the magnetic activating element on the piston passes chosen indication points on the sensor unit.

18. The device according to claim 17, wherein the elongate extruded cavity is closed with respect to an ambient environment.

19. The device according to claim 17, wherein the sensor unit is an elongate sensor.

20. The device according to claim 17, wherein the sensor unit is an electronic sensor.

* * * * *